H. CLAUSS.
SHEARS.
APPLICATION FILED FEB. 25, 1915.
1,159,360.
Patented Nov. 9, 1915.
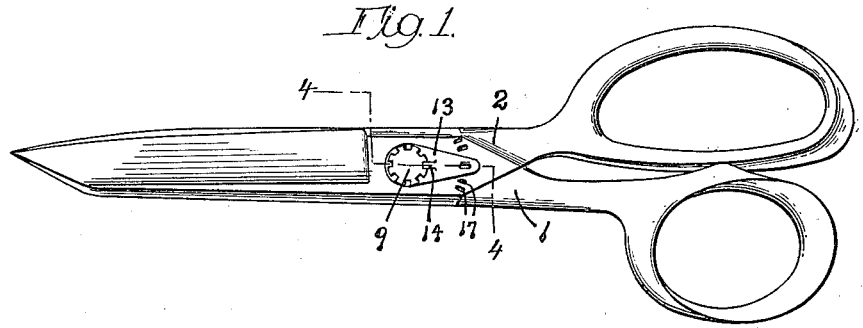
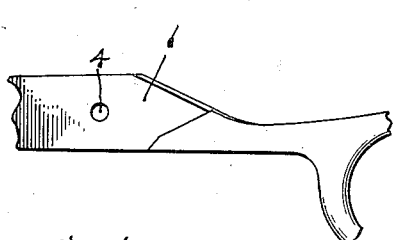
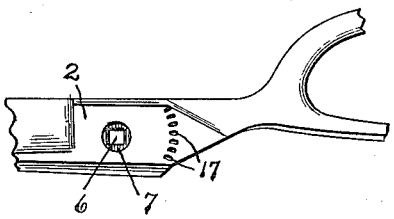
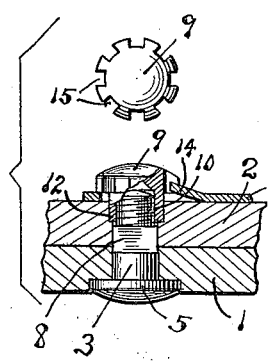
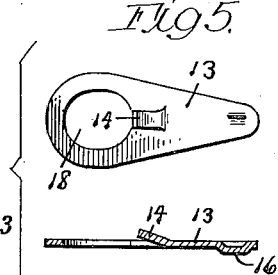
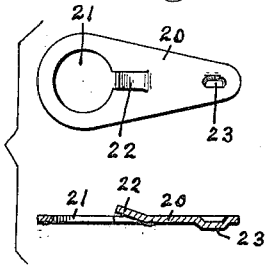
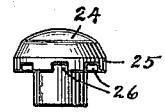
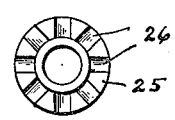
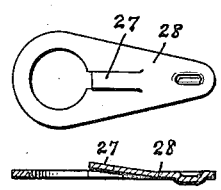
Witnesses
E. R. Barrett
H. W. Kreinbring
Inventor
Henrie Clauss.
By Pagelsen and Spencer
Attys.

UNITED STATES PATENT OFFICE.

HENRIE CLAUSS, OF FREMONT, OHIO.

SHEARS.

1,159,360. Specification of Letters Patent. Patented Nov. 9, 1915.

Application filed February 25, 1915. Serial No. 10,444.

*To all whom it may concern:*

Be it known that I, HENRIE CLAUSS, a citizen of the United States, and a resident of Fremont, in the county of Sandusky and State of Ohio, have invented a new and Improved Shears, of which the following is a specification.

This invention relates to adjustable bolts or pivots for scissors, shears and similar tools having two cutting members, and its object is to provide means for readily and accurately locking the nut of the pivot in any desired position relative to the pivot.

This invention consists, in combination with the two members constituting the cutting tool, having alined holes for the pivot, a pivot rotatably mounted in the hole in one member and prevented by its form from rotating in the hole in the second member, a nut on said pivot outside of the second member, and a resilient arm adjustably connected to said nut, the outer end of said arm being adapted to engage retaining devices on the second member.

In the accompanying drawing, Figure 1 is a plan of one embodiment of this invention. Fig. 2 is a plan of the joint portion of one member of the shears shown in Fig. 1, and Fig. 3 of the other. Fig. 4 is a section on the line 4—4 of Fig. 1 with the nut shown in plan. Fig. 5 is a plan and section of the locking member. Fig. 6 is a plan and section of a slightly modified form of locking member. Fig. 7 shows the nut and locking member of another modification.

Similar reference characters refer to like parts throughout the several views.

Referring to the drawings, the shears there represented consist of two members 1 and 2. The member 2 has a round hole 4 to receive the bolt or pivot 3, and may be countersunk to receive the head 5 of the bolt, as shown in Fig. 4. The member 1 has a hole which is of such shape as to prevent the bolt from turning therein, the bolt being of similar cross section. In Fig. 3, the preferred square form is shown although any other desired cross section may be adopted. The outer portion of the hole may be countersunk cylindrically to receive the cylindrical portion of the nut. In Fig. 3, this square portion of the hole is indicated by 6 and the cylindrical portion by 7, while 8 indicates the square portion of the bolt in Fig. 4.

The nut 9 that screws onto the threaded portion 10 of the bolt may be turned down to fit in the cylindrical hole 7 of the member 1, and preferably bottoms therein. Its cylindrical portion 12 furnishes a guide for the locking device 13, which may be punched from thin sheet steel and provided with a tongue 14, that may engage in any one of the notches 15 in the circumferential shoulder on the nut, and with a projection 16 that may enter any one of the depressions 17 in the member 2. The notches 15 and depressions 17 are preferably evenly spaced.

As will be seen in Figs. 4 and 5, the hole 18 in the locking member 13 is of such length that when the member is slid to the right in Fig. 4, the tongue 14 will slide out of the notch 15 so that the nut can be turned independently of the locking member. The width of the hole 18 is not sufficient to permit the locking member being slipped over the nut.

When the tool is to be assembled, the bolt is inserted through the hole 4 in the member 1 and then through the hole in the member 2, after which the nut with the locking member 13 mounted on the cylindrical portion 12 is screwed onto the threaded end 10 of the bolt. After the nut has been screwed down as hard as desired to get proper contact between the cutting blades, it may be turned back about one-fourth revolution, and the locking member moved to extend at about right angles to the member 2, that is, upward in Fig. 1. The tongue 14 is then moved into a notch 15, after which the locking member and nut are turned to the right, which brings the projection 16 into the row of recesses 17. This locks the nut in exactly the desired position, and with eight notches in the nut and seven recesses in the shear member, a movement of less than one-fiftieth of a turn can be accurately obtained. If closer adjustment is desired, the notches and depressions may be made closer together.

In Fig. 6, the locking member 20 has a round hole 21, a tongue 22 and a projection 23. When this locking member is employed, the nut must be unscrewed far enough to lift the notched shoulder above the tongue 21, after which the locking member can be turned relative to the nut. In all cases the notched annular shoulder is preferably at such a distance from the member 2, when the cylindrical portion of the nut bottoms in the round hole 7, that the locking plate will be held flat against the member 2; so much so, that the outer end must be bent up to free the detent at its end from a depression 17. This prevents undesired movement of the nut.

In Fig. 7, the nut 24 has a circumferential shoulder 25 provided with notches 26 in its lower face into which the tongue 27 of the locking member 28 may engage. In this case, however, the tongue 27 is considerably longer than either of the tongues 14 or 22, which insures flexibility sufficient to allow the inner end of the tongue to be depressed by merely pressing on it with the thumb nail. The locking member may then be swung laterally the necessary distance to bring the tongue in alinement with the desired notch into which it snaps on pressure being removed from its upper surface. In all these constructions, the angular distance between the notches in the nut should be less than the angular distance covered by the depressions 17.

It will be understood that this locking device is adapted to properly position the nut on the pivot bolt of substantially every type of tool provided with two members pivoted together and that the details and proportions of all the parts may be modified by those skilled in the art without departing from the spirit of my invention set forth in the claims.

I claim:—

1. The combination of a pair of pivotally connected cutting members each provided with a pivot hole, a headed bolt revolubly mounted in the pivot hole of one member and held from revolving in the pivot hole of the second member, said second member having a series of spaced recesses, a nut on the bolt adjacent the second member and provided with circumferentially spaced notches, and a turning and locking device for the nut having means for engaging in any one of the notches of the nut and having a projection engaging recesses in said second member.

2. The combination of a pair of pivotally connected cutting members each provided with a pivot hole, a headed bolt revolubly mounted in the pivot hole of one member and held from revolving in the pivot hole of the second member, said second member having recesses spaced circumferentially of the bolt, a nut on the bolt adjacent the second member and provided with circumferentially spaced notches, and a turning and locking device for the nut having means for engaging in any one of the notches of the nut and having a projection engaging recesses in said second member.

3. The combination of a pair of pivotally connected members with alined pivot holes, a headed bolt extending through said holes and revolubly mounted in one member and with its head in contact therewith, said bolt being held from turning in the pivot hole of the second member, said second member having a series of spaced recesses, a nut on the end of the bolt and in contact with the second member, said nut having a cylindrical portion and a notched circumferential shoulder, and a thin sheet metal locking device mounted on the cylindrical portion of the nut, whereby the nut may be turned, and having a resilient tongue adapted to engage in the notches in the shoulder and also having a projection adapted to engage in recesses in said second member.

4. The combination of a pair of pivotally connected members with alined pivot holes, a headed bolt extending through said holes and revolubly mounted in one member and with its head in contact therewith, said bolt being held from turning in the pivot hole of the second member, said second member having a circular row of spaced recesses, a nut on the end of the bolt and in contact with the second member, said nut having a cylindrical portion and a notched circumferential shoulder, and a thin sheet metal locking device mounted on the cylindrical portion of the nut and having a resilient tongue adapted to engage in the notches in the shoulder and also having a projection adapted to engage in recesses in said second member, said locking member being held in position by the annular notched shoulder on the nut.

In testimony whereof I sign this specification in the presence of two subscribing witnesses.

HENRIE CLAUSS.

Witnesses:
B. H. ADLER,
M. F. WEINHARDT.

Copies of this patent may be obtained for five cents each, by addressing the "Commissioner of Patents, Washington, D. C."